United States Patent

[11] 3,576,289

| [72] | Inventors | Wilmer E. Funk<br>Roanoke;<br>Howard M. Hilgers, East Peoria; Ira H.<br>Sage, Peoria, Ill. |
|---|---|---|
| [21] | Appl. No. | 787,019 |
| [22] | Filed | Dec. 26, 1968 |
| [45] | Patented | Apr. 27, 1971 |
| [73] | Assignee | Caterpillar Tractor Co.<br>Peoria, Ill. |

[54] COMBINED SPINDLE AND INTERNAL CHUCK FOR FRICTION WELDER
4 Claims, 2 Drawing Figs.

[52] U.S. Cl................................................. 228/2,
29/470.3, 156/73, 279/4, 308/9
[51] Int. Cl.................................................... B23k 27/00
[50] Field of Search.......................................... 228/2;
29/470.3; 156/73; 308/9; 279/4

[56] References Cited
UNITED STATES PATENTS

| 2,744,756 | 5/1956 | Atherholt, Sr., et al. | 279/2 |
| 3,210,088 | 10/1965 | Williamson et al. | 279/4 |
| 3,380,641 | 4/1968 | Deemie et al. | 228/2 |
| 3,396,893 | 8/1968 | Cress et al. | 29/470.3X |
| 3,412,916 | 11/1968 | Dunlap et al. | 228/2 |
| 3,453,032 | 7/1969 | Oberle | 308/9 |

*Primary Examiner*—John F. Campbell
*Assistant Examiner*—Robert J. Craig
*Attorney*—Fryer, Tjensvold, Feix, Phillips & Lempio

ABSTRACT: A friction welding machine has a workpiece holding chuck located inside a rotary spindle in order to reduce spindle bearing loads and alleviate problems of workpiece misalignment.

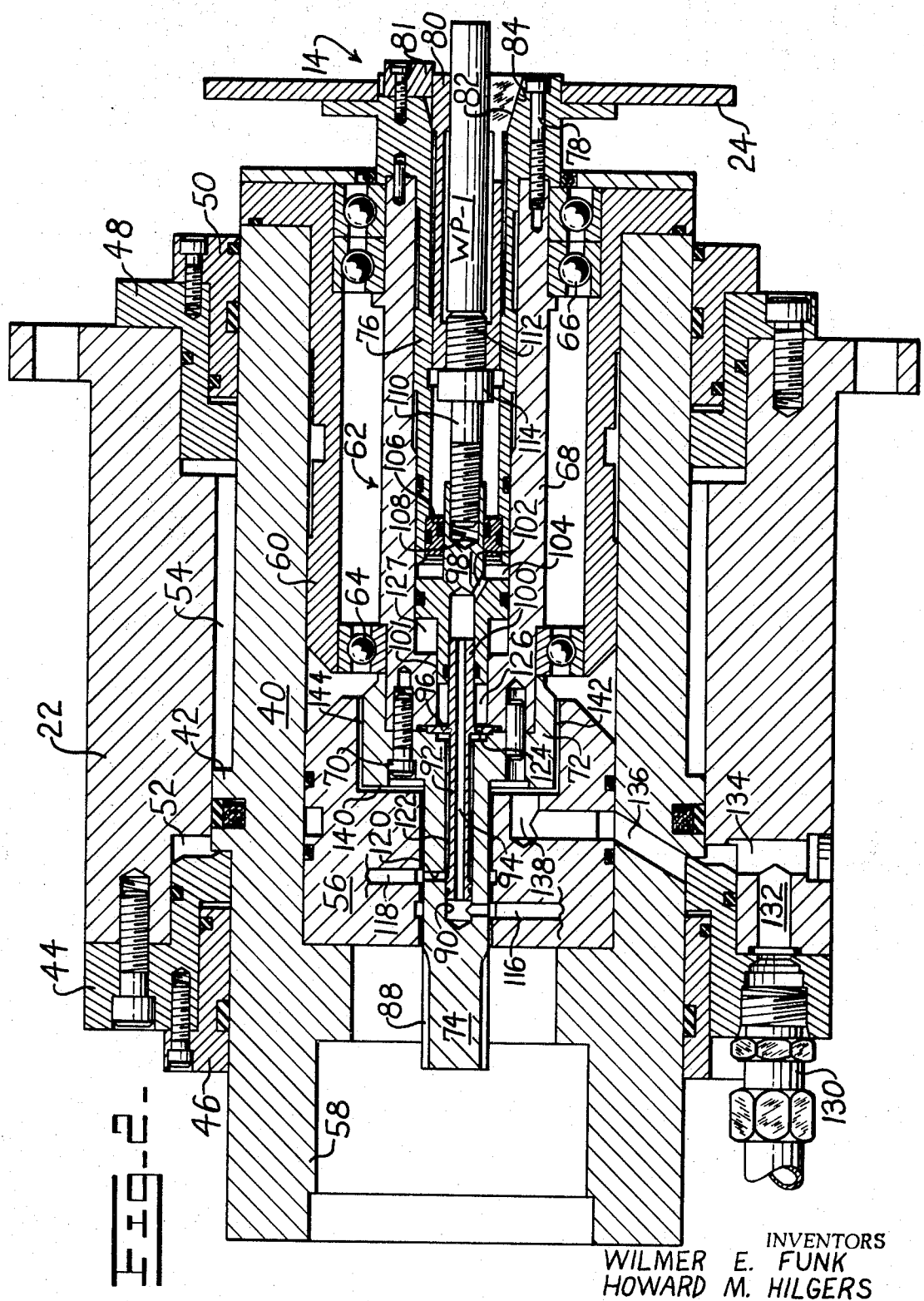

COMBINED SPINDLE AND INTERNAL CHUCK FOR FRICTION WELDER

BACKGROUND OF THE INVENTION

This invention relates to friction welding of the general type wherein two workpieces are subjected to relative rotation while in rubbing contact with each other to generate frictional heat to raise the workpieces to a suitable welding temperature, whereupon the relative rotation subsides and a bond is formed between the workpieces.

It is also to be understood that the invention is applicable to the inertia friction welding process as described in U.S. Pat. No. 3,273,233 and as set forth below.

In the inertia welding process the energy required to bring the common interface of the parts to a bondable condition is stored as kinetic energy in rotating inertia weights. These weights generally take the form of flywheels and are connected to one of the parts and the entire energy to form the bond is stored in the weights prior to the engagement of the parts at the interface. The stored energy is discharged into the interface through frictional heating and plastic working developed at the interface as the rubbing contact slows the rotating weights and the bonding cycle is concluded.

The invention is particularly directed to a combined spindle and internal chuck for a friction welding machine. More specifically, the combined spindle and chuck are constructed in a manner such that the chuck is located internally of the spindle rather than extending outboard of the spindle as in prior art friction welding devices.

Several important advantages are derived from the novel construction of the present invention wherein the workpiece holding chuck is located inside the rotating spindle. For example, placement of the chuck, and consequently a large portion of the workpiece, inside the spindle reduces the distance between the rear and front spindle bearings and the interface between the weld pieces. Thus, in conventional friction welding machines there is a large amount of "overhang" as a result of the workpiece holding chuck and the workpiece acting as a bending arm or moment during the welding operation. This bending moment produces large radial loads on the spindle bearings and oftentimes results in misalignment of the workpieces being welded. In the present invention the workpiece holding chuck is constructed inside the rotatable spindle and substantially eliminates the aforementioned bending arm. This results in a reduction of the radial load on spindle bearings and also reduces the chance of misalignment between the welded parts. Constructing the workpiece holding chuck inside the rotary spindle has the added advantage of improving the machine design by reducing the distance between the spindle and the tailstock work holding fixture.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is a longitudinal view, partially in section, illustrating structural details of a combined spindle and internal chuck constructed in accordance with the present invention.

DESCRIPTION OF THE PREFERRED EMBODIMENT

Figure 1:
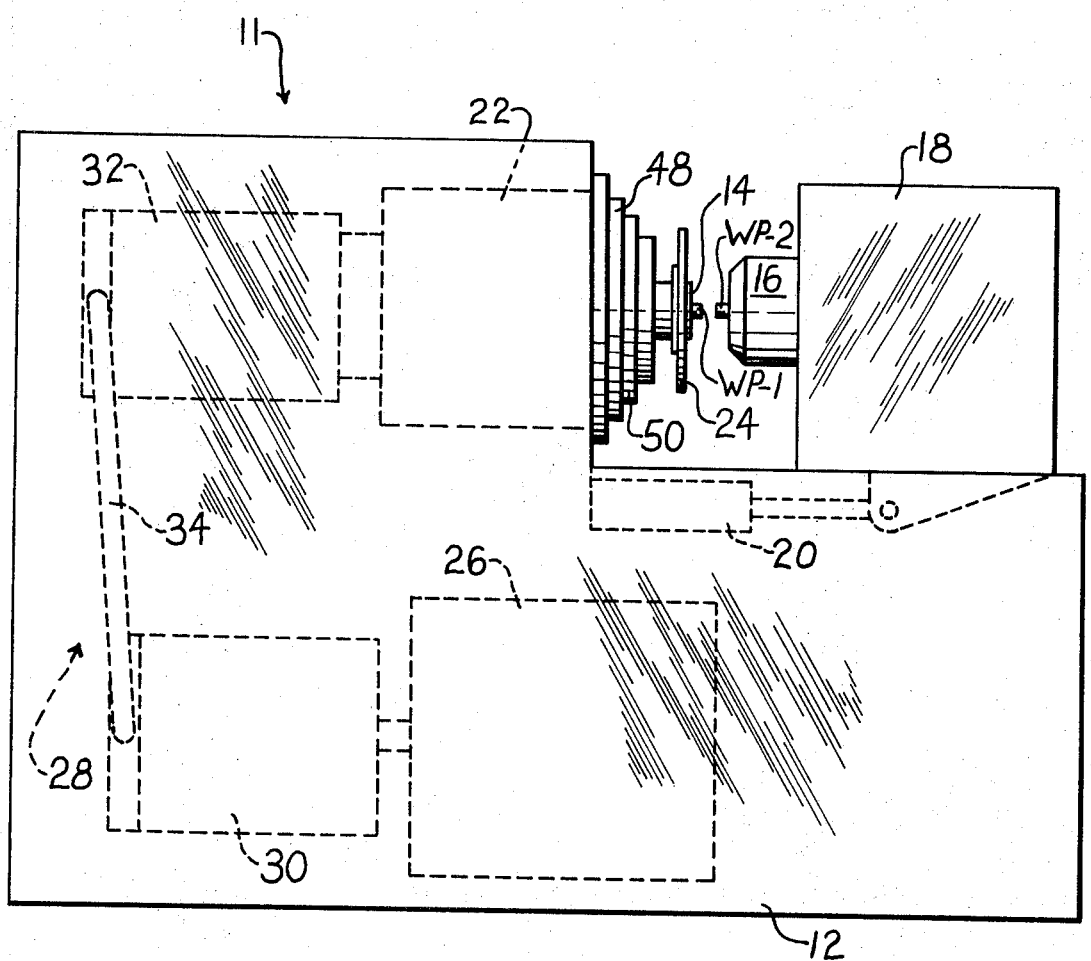
FIG. 1 is a side elevational view illustrating one embodiment of a friction welding machine which may be used to practice the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

As will be more fully understood from the detailed description infra, the chuck 14 is mounted inside a rotary spindle (not shown in FIG. 1) and the combined rotary spindle and chuck are received within a spindle housing 22 which is attached to the main frame 12. The chuck 14 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the rotatable chuck 14 so that the welding machine 11 can be operated as an inertia welding machine as described in U.S. Pat. No. 3,273,233 and as described in further detail below.

FIG. 2 illustrates the details of the new combined spindle and workpiece gripping means. As shown in FIG. 2, the spindle housing 22 slidably receives an axially movable spindle ram 40 which is provided with an annular piston 42. Suitable bushings 44, 46, 48 and 50 are provided and define fluid cavities 52 and 54 on each side of the piston 42. A thrust block 56 is secured near one end of a stepped bore 58 which extends axially throughout the length of the spindle ram 40. A bearing support member 60 is secured inside the bore 58 as shown. While the ram 40 for moving the workpieces into engagement has been shown as an integral portion of the spindle housing in FIG. 2, it is to be understood that the ram could be independent of the spindle housing and, in fact, could actuate a tailstock assembly such as shown in FIG. 1 wherein the ram 20 actuates the tailstock assembly 18.

A combined spindle and chucking assembly 62 is rotatably mounted inside the ram 40 by means of bearing assemblies 64 and 66. The combined spindle and chucking assembly comprises a chucking cylinder 68 which is suitably connected as at 70 to an enlarged thrust head 72 formed at one end of a rotatable shaft 74. A collet housing 76 which forms a portion of the workpiece gripper 14 is suitably secured inside the chucking cylinder 68 as by threaded means 78. A split-sleeve collet 80 is slidably received inside the collet housing 76 for relative axial movement with respect thereto. An alignment key 81 is bolted to the collet housing 76 to insure that the split-sleeve collet is retained in proper position. Mating tapers or cam surfaces 82 and 84 are formed on the collet housing 76 and split-sleeve collet 80, respectively. Thus, it will be understood that when the split-sleeve collet 80 is moved axially inwardly of the spindle housing 22, the cam surfaces 82 and 84 will cause the collet fingers to collapse radially inwardly and thereby tightly grip a workpiece WP-1.

Rotational motion may be imparted to the entire spindle and chucking assembly by means of the motor transmission drive system shown in FIG. 1 which is attached to the drive shaft 74 by means of a spline connection 88 formed at the end of the shaft. The shaft 74 is provided with an internal bore 90. The bore 90 receives a hollow sleeve 92 which has an internal bore 94 and an external annular flange 96. The sleeve is held in fixed position by means of the flange 96 which is abutted on one side by the thrust head 72 and on the other side by the chucking cylinder 68.

A chucking piston 98 is slidably received on the downstream end 100 of the sleeve 92. The radially outer wall 101 of a reduced diameter portion of the chucking piston 98 is received inside the chucking cylinder 68 in a manner which provides a small annular passageway between radially outer wall 101 and the chucking cylinder 68. This annular passageway between the radially outer wall 101 and the chucking cylinder 68 permits pressure fluid to flow from a cavity 126 to a cavity 127 as will be more clearly understood at a later point in the description. The piston 98 is provided with an internal bore 102 which provides fluid communication between a fluid cavity 104 and the sleeve and shaft bores 94 and 90, respectively. One end of the piston 98 is slidably received within a sealing block 106 and is provided with a bore 108 which threadably receives a threaded rod 110.

The threaded rod 110 is also threadably received within a bore 112 formed in the end of the split-sleeve collet 80. An annular flange element 114 is adjustably received upon the rod 110 and functions as a backup member for the split-sleeve collet 80.

It should be understood that when pressure fluid is passed through a port 116 in the thrust block 56 and thence through the bores 90, 94 and 102 to the fluid cavity 104, the piston 98 will move to the left, thereby causing the split-sleeve collet 80 to tightly grip the workpiece WP-1. In order to release the workpiece, pressure fluid may be passed through a port 118 in the thrust block 56 to a bore 120 formed in the shaft 74 and then to an annular area 122 formed between the outer wall of the sleeve 92 and the bore 90. This pressure fluid is then transferred through a bore 124 formed in the sleeve flange 96 to a pressure fluid cavity 126, and thence to a pressure fluid cavity 127 by way of the previously mentioned annulus between outer wall 101 of the piston 98 and the chucking cylinder 68. Fluid pressure in the cavities 126 and 127 forces the piston 98 to move to the right whereby the collet fingers may expand radially outwardly to release the workpiece WP-1.

To perform a welding operation, a workpiece WP-1 is inserted inside the split-sleeve collet 80 until it abuts the threaded portion 112 of the chucking piston assembly 98. Hydraulic fluid under pressure is then introduced into the cavity 104 of the chucking cylinder 68 which causes the chucking piston 98 to move leftwardly. The split-sleeve collet 80 also moves to the left since it is connected to the chucking piston assembly 98. As a result of this movement, the split-sleeve collet 80 collapses radially inwardly to firmly clamp the workpiece WP-1.

At this time, rotational motion is supplied to the drive shaft 74 by means of the previously mentioned drive train shown in FIG. 1. After a predetermined speed has been attained, the drive shaft 74 is disconnected from the power train by means of an overrunning clutch. Hydraulic fluid is then introduced into cavity 52 through a fitting 130 and passages 132 and 134 to move the ram 40 and all members within the ram axially outward of the spindle housing 22 for applying hydraulic welding pressure. As the ram 40 moves axially outwardly, hydraulic fluid under pressure is communicated through passages 136 and 138 to form a hydrostatic bearing in the area 140 formed between the thrust block 56 and the thrust head 72. Controlled leakage paths for the hydrostatic bearings are provided at 142 and 144. Thus, the welding thrust is absorbed by the hydrostatic bearing formed in the area 140, which is equal to the annular area of the ram 40.

As the rotating workpiece WP-1 comes into contact with the nonrotating workpiece WP-2, the welding thrust is transferred through the rotating workpiece WP-1 to the chucking piston 98. This force tends to move the chucking piston 98 axially inwardly which has the effect of tightening the split-sleeve collet 80 about the workpiece WP-1. In this manner the welding thrust is used to advantage to tighten the split-sleeve collet 80 about the rotating workpiece WP-1.

After the weld has been completed, the pressure fluid is drained from the cavity 104 and introduced into the cavity 126 which causes the chucking piston 98 to move axially outwardly thereby releasing the clamping force between the split-sleeve collet 80 and the workpiece WP-1. The welded assembly can then be removed from the machine and the operation repeated.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

I claim:

1. In a friction welding machine a combined spindle and workpiece gripping means comprising:
    a spindle housing;
    a spindle and chucking assembly rotatably mounted within said spindle housing to eliminate overhang and to minimize misalignment;
    said spindle and chucking assembly comprising a chucking cylinder;
    a collet housing formed within said chucking cylinder;
    a split-sleeve workpiece gripping means axially slidable within said collet housing;
    an axially movable chucking piston slidably received in said chucking cylinder and connected to said workpiece gripping means;
    double acting hydraulic means for supplying hydraulic fluid to the piston to produce rapid clamping and unclamping of the gripping means;
    said collet housing and said split-sleeve workpiece gripping means having cooperating tapered surfaces whereby axially inward movement of said piston causes radial contraction of said workpiece gripping means; and
    said split-sleeve workpiece gripping means including a backup member which engages the back of the workpiece to cause the axial load applied to the workpieces during welding to produce additional inward movement of the sleeve with respect to the housing and greater radial contraction of the gripping means.

2. Apparatus as set forth in claim 1 wherein an axially movable spindle ram is slidably received inside said spindly housing and the spindle and chucking assembly is rotatably mounted within said ram.

3. Apparatus as set forth in claim 1 wherein a rotatable drive shaft is connected to the chucking cylinder, said drive shaft having an enlarged thrust head seated in a thrust block and means communicating fluid pressure to the interface between the thrust head and thrust block to form a hydrostatic bearing therebetween during a friction welding operation.

4. Apparatus as set forth in claim 2 wherein a rotatable drive shaft is connected to the chucking cylinder, said drive shaft having an enlarged thrust head seated in a thrust block and means communicating fluid pressure to the interface between the thrust head and thrust block to form a hydrostatic bearing therebetween during a friction welding operation.